(12) United States Patent
Kikukawa et al.

(10) Patent No.: US 7,852,721 B2
(45) Date of Patent: Dec. 14, 2010

(54) METHOD FOR SETTING RECORDING POWER, MULTILAYER OPTICAL RECORDING MEDIUM, AND METHOD FOR RECORDING INFORMATION

(75) Inventors: Takashi Kikukawa, Tokyo (JP); Koji Mishima, Tokyo (JP)

(73) Assignee: TDK Corporation, Tokyo (JP)

( * ) Notice: Subject to any disclaimer, the term of this patent is extended or adjusted under 35 U.S.C. 154(b) by 378 days.

(21) Appl. No.: 12/171,345

(22) Filed: Jul. 11, 2008

(65) Prior Publication Data
US 2009/0016184 A1 Jan. 15, 2009

(30) Foreign Application Priority Data
Jul. 13, 2007 (JP) .............................. 2007-184076

(51) Int. Cl.
*G11B 7/00* (2006.01)
(52) U.S. Cl. ................ 369/47.53; 369/47.5; 369/59.11; 369/116
(58) Field of Classification Search ........................ None
See application file for complete search history.

(56) References Cited

U.S. PATENT DOCUMENTS 7,151,728 B2 * 12/2006 Shoji et al. ............... 369/47.53
7,408,860 B2 * 8/2008 Miura et al. .............. 369/59.11
7,781,146 B2 * 8/2010 Kakiuchi et al. ........ 430/270.12

OTHER PUBLICATIONS

Mishima et al. "150 GB, 6-layer Write Once Disc for Blu-Ray Disc System", Proc of SPIE 6282 62820I:1-11 (2006).

* cited by examiner

*Primary Examiner*—Muhammad N Edun
(74) *Attorney, Agent, or Firm*—Porzio, Bromberg & Newman, P.C.

(57) ABSTRACT

A method for setting recording power of recording light, capable of an appropriate setting for a multilayer optical recording medium. The recording power of the recording light for an information recording layer of the multilayer optical recording medium to be irradiated with, is set by: evaluating an information recording layer to be evaluated for recording power when all the information recording layer(s) lying closer to a light incident surface than the information recording layer to be evaluated does is/are in a low transmittance state; evaluating the information recording layer to be evaluated for recording power when all the information recording layer(s) lying closer to the light incident surface than the information recording layer to be evaluated does is/are in a high transmittance state; and determining ground information for setting recording power, based on these values of the recording power.

18 Claims, 8 Drawing Sheets

METHOD FOR SETTING RECORDING POWER, MULTILAYER OPTICAL RECORDING MEDIUM, AND METHOD FOR RECORDING INFORMATION

BACKGROUND OF THE INVENTION

1. Field of the Invention

The present invention relates to a method for setting recording power for a multilayer optical recording medium, the multilayer optical recording medium, and a method for recording information on the multilayer optical recording medium.

2. Description of the Related Art

Conventionally, optical recording media such as CD-DA, CD-ROM, CD-R, CD-RW, DVD-ROM, DVD-R, DVD+/-RW, and DVD-RAM have been widely used to view digital moving image contents and record digital data. In the meantime, optical recording media of these types have been demanding greater recording capacity year after year. To meet this demand, commercialization has started of so-called next-generation DVDs which are capable of recording a large volume of moving images or data. For increased recording capacity, the next-generation DVDs use laser light having a wavelength as short as 405 nm for recording and reading.

For example, the Blu-ray Disc (BD) standard, one of the next-generation DVD standards, makes it possible to record and read up to 25 GB on a single recording layer, with an objective lens of 0.85 in numerical aperture.

The sizes of moving images and data are expected to grow more and more in the future. As described in nonpatent document, K. Mishima et. al., Proc. of SPIE, 6282, 628201 (2006), there have thus been proposed technologies pertaining to a so-called multilayer optical recording medium in which recording layers are increased in number so as to increase the capacity of the optical recording medium. For BD-based multilayer optical recording media, some techniques have been proposed to achieve an ultra high capacity of 200 GB through the provision of six to eight recording layers.

When information recording layer in a multilayer medium is irradiated with laser light for recording, the amount of light to reach the information recording layer to be recorded depend on the recording states of information on the other information recording layers through which the laser light passes. The inventor's study, which is yet publicly unknown as of the filing of the present application, has revealed the following. Depending on difference in the transmittances of the information recording layers for the laser light to pass through, the proportion of the recording laser light to reach the intended information recording layer can differ by 10% or more, with an adverse effect on the recording quality of the information recording layer. In particular, there has been found the problem that the information recording layer farthest from a light incident surface can produce recording errors easily due to the foregoing transmittance difference since it must be irradiated with the laser light through all the other information recording layers.

SUMMARY OF THE INVENTION

The present invention has been achieved in view of the foregoing problems. It is thus an object of the present invention to provide a method for setting optimum recording power even for an optical recording medium that is multilayered.

The inventor has made intensive studies and achieved the foregoing object by the provision of the following means.

A first aspect of the present invention for achieving the foregoing object is a method for setting recording power of recording light for an information recording layer of a multilayer optical recording medium to be irradiated with, the multilayer optical recording medium, the method including: a low transmittance state evaluation step of evaluating recording power capable of recording information on an information recording layer to be evaluated when all the information recording layer(s) lying closer to a light incident surface than the information recording layer to be evaluated does is/are in a low transmittance state based on the presence or absence of a recording mark; a high transmittance state evaluation step of evaluating recording power capable of recording information on the information recording layer to be evaluated when all the information recording layer(s) lying closer to the light incident surface than the information recording layer to be evaluated does is/are in a high transmittance state based on the presence or absence of a recording mark; and a ground information determination step of determining ground information for setting recording power for use on the information recording layer to be evaluated, based on the recording power evaluated at the low transmittance state evaluation step and the recording power evaluated at the high transmittance state evaluation step.

A second aspect of the present invention for achieving the foregoing object is the method for setting recording power of recording light according to the foregoing aspect, wherein the ground information determined is any one of a numerical range of the recording power, a recommended value of the recording power, and an optimum value of the recording power.

A third aspect of the present invention for achieving the foregoing object is the method for setting recording power of recording light according to anyone of the foregoing aspects, wherein: the low transmittance state evaluation step includes evaluating a recording power margin of the recording light for the information recording layer to be evaluated to be irradiated with; the high transmittance state evaluation step includes evaluating a recording power margin of the recording light for the information recording layer to be evaluated to be irradiated with; and the ground information determination step includes determining the ground information within a range that applies to both the recording power margin evaluated at the low transmittance state evaluation step and the recording power margin evaluated at the high transmittance state evaluation step.

A fourth aspect of the present invention for achieving the foregoing object is the method for setting recording power of recording light according to any one of the foregoing aspects, wherein the multilayer optical recording medium is capable of forming three or more information recording layers.

A fifth aspect of the present invention for achieving the foregoing object is the method for setting recording power of recording light according to any one of the foregoing aspects, wherein the ground information is determined with the information recording layer farthest from the light incident surface as the one to be evaluated.

A sixth aspect of the present invention for achieving the foregoing object is a multilayer optical recording medium having a management area in which the ground information according to any one of the foregoing aspects is recorded in advance.

A seventh aspect of the present invention for achieving the foregoing object is a multilayer optical recording medium capable of forming a plurality of information recording layers, the multilayer optical recording medium including: a low transmittance test area for producing a low transmittance state equivalent to one the information recording layers take based on the presence or absence of a recording mark; and a high transmittance test area for producing a high transmittance state equivalent to one the information recording layers take based on the presence or absence of a recording mark.

An eighth aspect of the present invention for achieving the foregoing object is a method for recording information on a multilayer optical recording medium by irradiating an information recording layer of the optical recording medium with recording light to record information on the information recording layer, the multilayer optical recording medium being capable of forming three or more information recording layers, wherein information is recorded by irradiating the information recording layer to be recorded with recording light having optimum recording power that applies to both recording power capable of recording information on the information recording layer to be recorded when all the information recording layer(s) lying closer to a light incident surface than the information recording layer to be recorded does is/are in a low transmittance state based on the presence or absence of a recording mark, and recording power capable of recording information on the information recording layer to be recorded when all the information recording layer(s) lying closer to the light incident surface than the information recording layer to be recorded does is/are in a high transmittance state based on the presence or absence of a recording mark.

According to the present invention, it is possible to provide the excellent effect that the recording light for a multilayer optical recording medium can be set to optimum power appropriately for improved recording quality.

BRIEF DESCRIPTION OF THE DRAWINGS

The above and other objects, features and advantages of the present invention will become apparent from the following description and appended claims, taken in conjunction with the accompanying drawings.

DETAILED DESCRIPTION OF THE PREFERRED EMBODIMENTS

First, a method for setting recording power according to an embodiment of the present invention will be described along with its supporting concepts.

Figure 1:
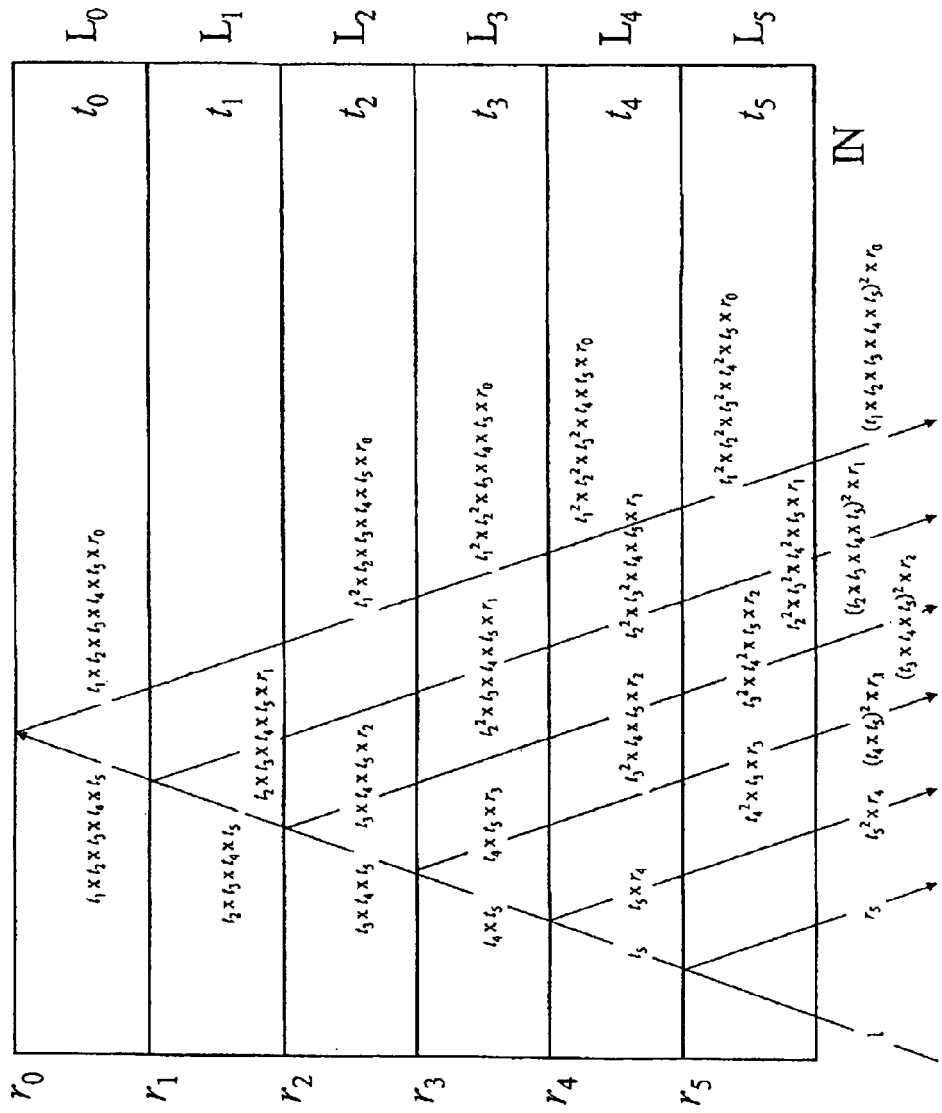
FIG. 1 is a sectional view for explaining the concept of reflectances in a multilayer optical recording medium according to an embodiment of the present invention.

Take, for example, a multilayer optical recording medium that has six information recording layers, namely, an $L_0$ layer, . . . , an $L_k$ layer, . . . , and an $L_5$ layer. Here, $r_k$ shall be the reflectance of the $L_k$ layer itself in the multilayer recording medium, $t_k$ shall be the transmittance of that information recording layer itself, and $R_k$ shall be the reflectance of the $L_k$ layer when irradiated with laser light in the stacked state ($0 \leq k \leq 5$). The reflectance $R_k$, in other words, refers to the total reflectance which is determined by the amount of light incident on a light incident surface and the amount of reflection to be emitted from this light incident surface. As shown in FIG. 1, each information recording layer reflects a part of laser light and transmits another. Suppose, for example, that the $L_3$ layer is irradiated with laser light having an energy of 1. Entering from the light incident surface IN, the laser light is initially transmitted through the $L_5$ layer by a ratio of $t_5$ to reach the $L_4$ layer, and then transmitted through the $L_4$ layer by a ratio of $t_4$ to reach the $L_3$ layer. The $L_3$ layer is thus irradiated with laser light of $t_4 \times t_5$. This laser light ($t_4 \times t_5$) is reflected by the $L_3$ layer by a ratio of $r_3$. The reflected light from the $L_3$ layer is thus ($t_4 \times t_5$)$\times r_3$. This reflected light is further transmitted through the $L_4$ layer and the Ls layer by the respective ratios of $t_4$ and $t_5$, and is emitted from the light incident surface IN. In consequence, with the laser light entering from the light incident surface IN as a base of 1, the total reflectance $R_3$ of the reflection from the $L_3$ layer, to be emitted out of the light incident surface IN, is given by $(t_4 \times t_5)^2 \times r_3$. Similarly, $R_0, R_1, \ldots, R_5$ are given by the following equations.

[Calculation Formulas of Total Reflectance]

$$R_0 = (t_1 \times t_2 \times t_3 \times t_4 \times t_5)^2 \times r_0,$$

$$R_1 = (t_2 \times t_3 \times t_4 \times t_5)^2 \times r_1,$$

$$R_2 = (t_3 \times t_4 \times t_5)^2 \times r_2,$$

$$R_3 = (t_4 \times t_5)^2 \times r_3,$$

$$R_4 = (t_5)^2 \times r_4, \text{ and}$$

$$R_5 = r_5.$$

In order for an information recording and reading apparatus to read all the information recording layers under the same reading condition, it is desirable that the total reflectances of the respective layers be identical. More specifically, $R_0 = R_1 = R_2 = R_3 = R_4 = R_5$ are desirable in the foregoing example. Given the total reflectances $R_0 = R_1 = R_2 = R_3 = R_4 = R_5 = 2.5\%$, Table 1 shows an example of the reflectances $r_k$ and transmittances $t_k$ of the respective recording layers.

TABLE 1

| Recording layer $L_n$ | Reflectance $r_k$ (%) | Transmittance $t_k$ (%) | Total reflectance $R_k$ (%) |
| --- | --- | --- | --- |
| $L_5$ | 2.5 | 87.7 | 2.5 |
| $L_4$ | 3.1 | 86.0 | 2.5 |
| $L_3$ | 4.2 | 83.1 | 2.5 |
| $L_2$ | 6.0 | 79.0 | 2.5 |
| $L_1$ | 9.4 | 73.1 | 2.5 |
| $L_0$ | 18.0 | 47.3 | 2.5 |

As can be seen from this Table 1, when providing the same total reflectances $R_k$ for the respective information recording layers, it is preferable that information recording layers lying farther from the light incident side have lower transmittances $t_k$. Note that the relation $r_k+t_k+a_k=1$ holds true, where $a_k$ is the absorptance of laser light at the information recording layer.

Under the circumstances, consider now the case where a pickup irradiates the $L_k$ layer, in a multilayer optical recording medium having n layers or $L_0$ to $L_{n-1}$ layers ($k \leq n$), with laser light having a laser power of 1. The $L_k$ layer shall have a transmittance $t_{bk}$ ($0 \leq t_{bk} \leq 1$) when in a blank state, and a transmittance $t_{mk}$ ($0 \leq t_{mk} \leq 1$) when in a recorded state.

If user information is recorded on none of the $L_1$ to $L_{n-1}$ layers, i.e., if all the recording layers lying closer to the light incident surface than the $L_0$ layer does are in a "blank state," then the laser power $I_{b0}$ to reach this $L_0$ layer is given by $I_{b0}=t_{b1} \times \ldots \times t_{bk} \times \ldots \times t_{b(n-1)}$. On the other hand, if user information is recorded on all the $L_1$ to $L_{n-1}$ layers, i.e., if all the recording layers lying closer to the light incident surface than the $L_0$ layer does are in a "recorded state," then the laser power $I_{m0}$ to reach the $L_0$ layer is given by $I_{m0}=t_{m1} \times \ldots \times t_{mk} \times \ldots \times t_{m(n-1)}$. The difference between $I_{b0}$ and $I_{m0}$ is expressed as $I_{b0}/I_{m0}=\{t_{b1} \times \ldots \times t_{bk} \times \ldots \times t_{b(n-1)}\}/\{t_{m1} \times \ldots \times t_{mk} \times \ldots \times t_{m(n-1)}\}$ by ratio. From the viewpoint of the recording drive, it is desirable that the laser power for recording on the $L_0$ layer does not depend on the recording states of the other recording layers Ideally, $I_{b0}/I_{m0}=1$.

Multilayer optical recording media, however, output their signals in the form of differences in reflectance $r_k$ between the blank and recorded states ($r_{bk}-r_{mk}$). That is, the differences are indispensable. The absorptance $a_k$ is a factor to determine the forming rate and the like of recording marks to be formed on the information recording layer. The absorptance $a_k$ is preferably high so that recording can be performed with low power. Meanwhile, the absorptance $a_k$ must be suppressed to such an extent that the information recording layer will not be degraded or deteriorated by the irradiation of reading laser light. Since the absorptance $a_k$ has a certain limit in value, the foregoing difference in reflectance ($r_{bk}-r_{mk}$) is eventually reflected heavily on a difference in transmittance ($t_{bk}-t_{mk}$). This makes it extremely difficult to set the ratio $Ib_0/I_{m0}$ to 1.

The foregoing discussion will be verified with concrete figures. Information recording layers intended for a multilayer optical recording medium shall be made of $TiO_2$/Bi—Ge—O/$TiO_2$ which have extremely high transmittance. These information recording layers can provide $t_b=0.83$ and $t_m=0.88$ by adjusting the thicknesses of the respective materials and the composition of Bi—Ge—O. Table 2 shows the results of examination of the power $I_{b0}$ and $I_{m0}$, for various numbers of layers n, with which laser light of laser power I reaches the $L_0$ layer that lies farthest from the light incident surface. The shown values are for situations where all the recording layers of the $L_1$ to $L_{n-1}$ layers lying closer to the light incident surface than the $L_0$ layer does are made of the materials having the transmittances of $t_b=0.83$ and $t_m=0.88$.

TABLE 2

| Number of layers | Recorded state | Blank state | Rate of change |
|---|---|---|---|
| N = 2: | $I_{b0}$ = 0.83I | $I_{m0}$ = 0.88I | $I_{b0}/I_{m0}$ = 0.94 |
| N = 3: | $I_{b0}$ = 0.69I | $I_{m0}$ = 0.77I | $I_{b0}/I_{m0}$ = 0.90 |
| N = 4: | $I_{b0}$ = 0.57I | $I_{m0}$ = 0.68I | $I_{b0}/I_{m0}$ = 0.84 |
| N = 5: | $I_{b0}$ = 0.47I | $I_{m0}$ = 0.60I | $I_{b0}/I_{m0}$ = 0.78 |
| N = 6: | $I_{b0}$ = 0.33I | $I_{m0}$ = 0.46I | $I_{b0}/I_{m0}$ = 0.72 |

As is clear from these results, the power to reach the $L_0$ layer, when the $L_0$ layer is irradiated with the recording layer light, varies significantly depending on whether the other layers are recorded or not. Specifically, with the dual-layer optical recording medium (N=2), the power to reach the $L_0$ layer varies by 6% depending on whether the $L_1$ layer is in a recorded state or blank state. With the three-layer optical recording medium, the power to reach the $L_0$ layer varies by 10% depending on whether the $L_1$ and $L_2$ layers are in a recorded state or blank state. Similarly, it is seen that the four-layer optical recording medium varies by 16%, the five-layer optical recording medium varies by 22%, and the six-layer optical recording medium varies by 28%.

This fact presents a nonnegligible problem to the $L_0$ layer where the laser light reaches with reduced recording power in the first place. To be more specific, if ground information intended for setting the recording power, preset in the multilayer optical recording medium (such as a recording power range, recommended recording power, and optimum recording power) is inappropriate, recording errors can occur when recording information on the to layer in particular. Possible recording errors include insufficient formation of recording marks on the information recording layer due to lack of power, as well as unexpected shapes of recording marks due to excessive power.

Figure 2:
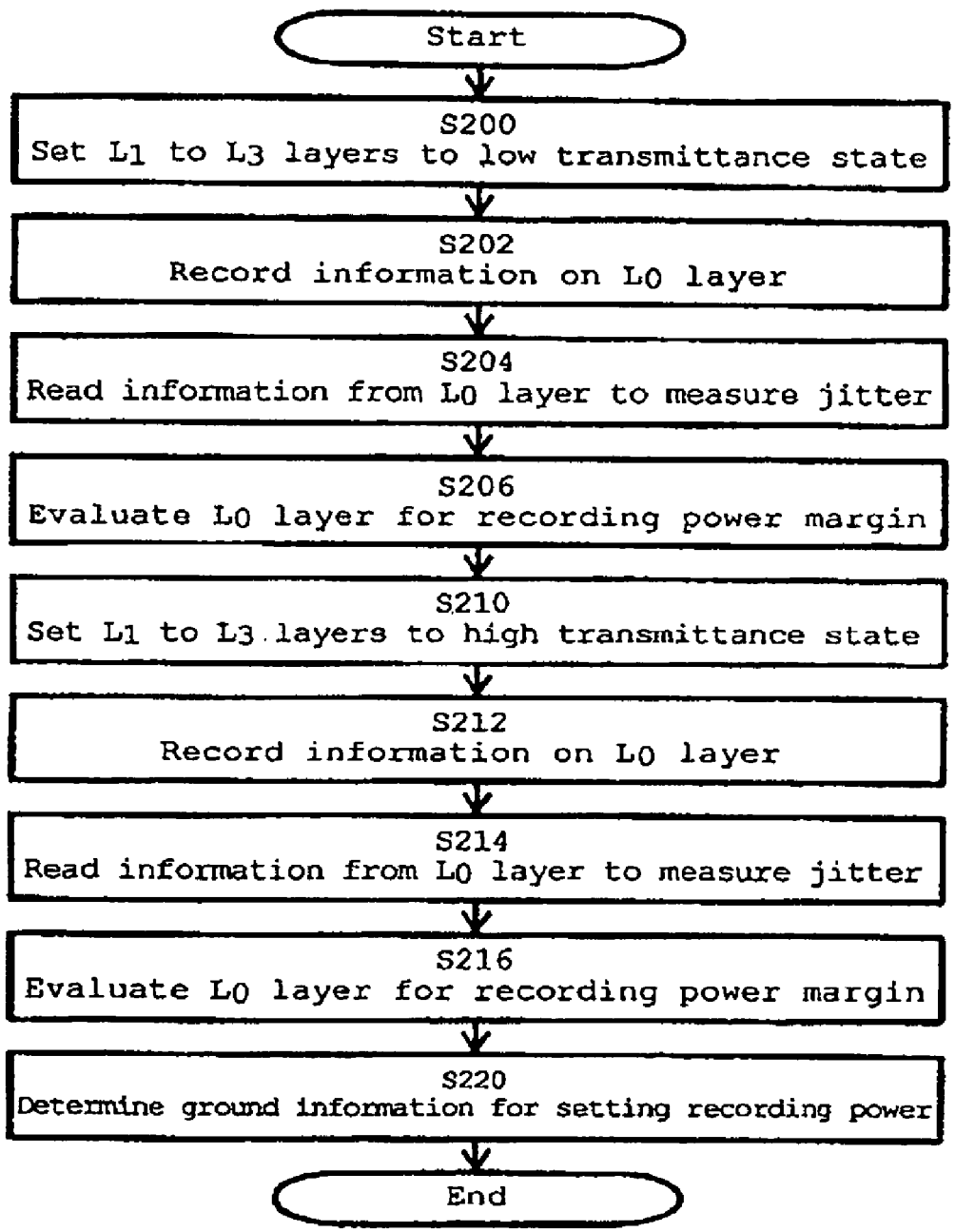
FIG. 2 is a flowchart showing the steps of setting recording power for the multilayer optical recording medium according to the embodiment of the present invention.

In the present embodiment, a method shown by the flow-chart of FIG. 2 is then used to determine the ground information for setting recording power for the multilayer optical recording medium. The recording power is set based on this ground information.

Initially, at step 200, information is recorded on all the recording layers that lie closer to the light incident surface than the $L_0$ layer does (i.e., the $L_1$ to $L_{n-1}$ layers), with this $L_0$ layer as the target of evaluation. As a result, the $L_1$ to $L_{n-1}$ layers enter a "recorded state," or a "low transmittance state" where the presence of the recording marks makes it more difficult to transmit light. Next, at step 202, the $L_0$ layer is irradiated with laser light to record information, with stepwise changes in the recording power. Note that this laser light is transmitted through the $L_1$ to $L_{n-1}$ layers before reaching the $L_0$ layer. At step 204, information is read from this $L_0$ layer to check the signal quality by means of jitters. At step 206, based on this check result, the allowable range (margin) of the recording power is determined so as to satisfy a jitter level required of the multilayer optical recording medium.

Proceeding to step 210, all the recording layers lying closer to the light incident surface than the $L_0$ layer does (i.e., the $L_1$ to $L_{n-1}$ layers) are brought into a state where no information is recorded, with this $L_0$ layer as the target of evaluation again. As a result, the $L_1$ to $L_{n-1}$ layers enter a "blank state," or a "high transmittance state" where the absence of recording marks facilitates light transmission. Next, at step 212, the $L_0$ layer is irradiated with laser light to record information, with stepwise changes in the recording power. At step 214, information is read from this $L_0$ layer to check the signal quality by means of jitters. At step 216, based on this check result, the allowable range (margin) of the recording power is determined so as to satisfy the jitter level required of the multilayer optical recording medium.

Finally, at step 220, the recording power margin of the $L_0$ layer in the "low transmittance state," determined at step 206, and the recording power margin of the $L_0$ layer in the "high transmittance state," determined at step 216, are compared to determine the ground information for setting recording power within a range that applies to both the margins. This ground information describes recording power values (recording power range) that apply to both the cases when it is the most difficult for the recording laser light to reach the $L_0$ layer and when it is the easiest. The ground information is recorded in advance on a disc information area of this multilayer optical recording medium when mass-producing this medium. When recording information on the multilayer optical recording medium, this ground information is referred to set the recording power.

As employed herein, the "low transmittance state" and "high transmittance state" of an information recording layer refer to the states where the transmittance is low and high, respectively, based on the presence or absence of recording marks, or user information. The correspondence varies depending on the characteristics of the information recording layer. For example, if an information recording layer has the characteristic of increasing in light reflectance where recording marks are formed, then the information recording layer enters the low transmittance state in the presence of recording marks. If an information recording layer has the characteristic of decreasing in light reflectance where recording marks are formed, then the information recording layer enters the high transmittance state in the presence of recording marks.

Moreover, the "recorded state" and "blank state" of an information recording layer as employed herein pertain to if user information to be stored is recorded on the information recording layer, not if disc management information or the like is.

Now, a description will be given of a multilayer optical recording medium which is manufactured by using the foregoing method for setting recording power, and an information recording method which records information by using this recording power.

Figure 3A:
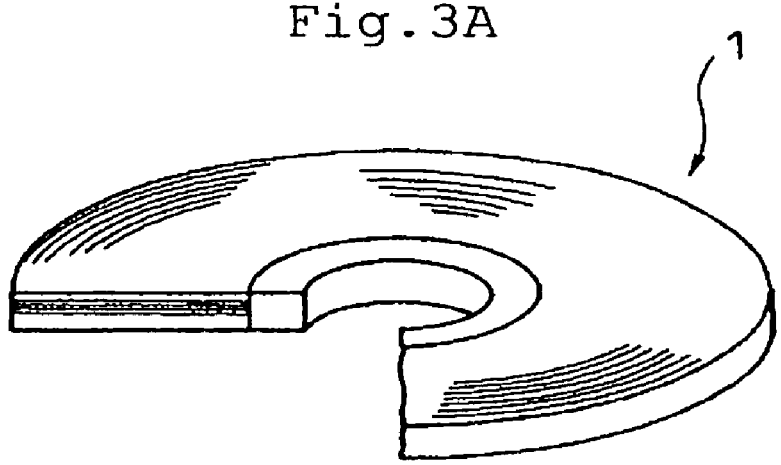
FIGS. 3A and 3B area perspective view and an enlarged sectional view of the multilayer optical recording medium for use in the embodiment of the present invention.
Figure 3B:
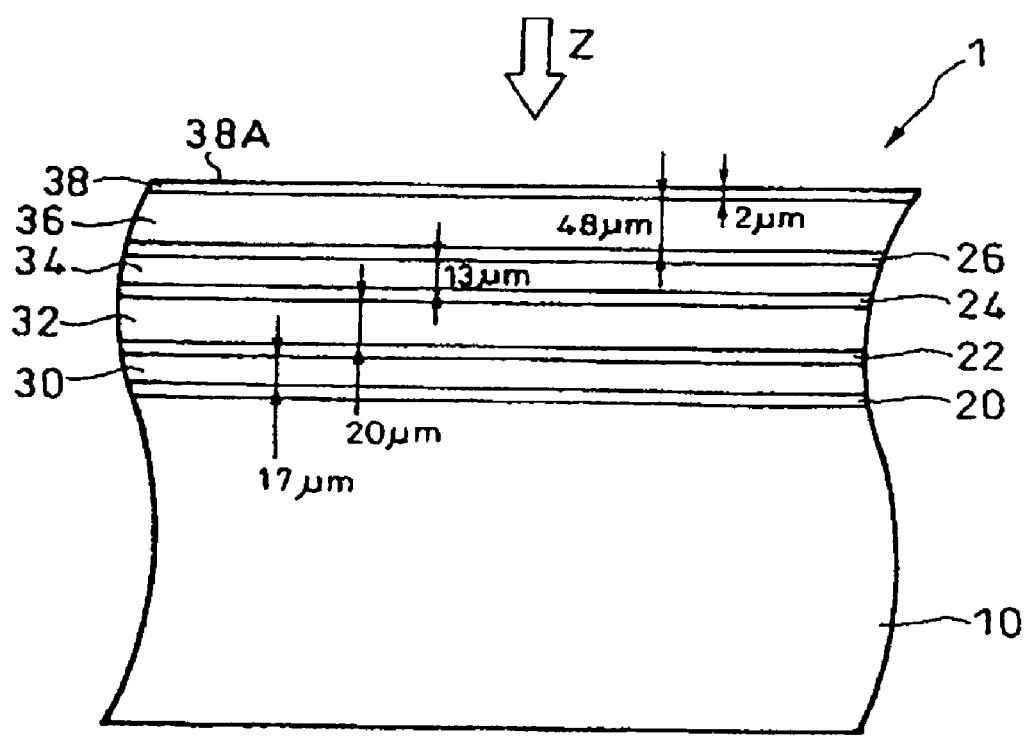

FIG. 3A shows an overview of a multilayer optical recording medium 1. This multilayer optical recording medium 1 is a disc-like medium, having an outer diameter of approximately 120 mm and a thickness of approximately 1.2 mm. As shown enlarged in FIG. 3B, the multilayer optical recording medium 1 is configured to include a substrate 10, an $L_0$ information recording layer 20, a first spacer layer 30, an $L_1$ information recording layer 22, a second spacer layer 32, an $L_2$ information recording layer 24, a third spacer layer 34, an $L_3$ information recording layer 26, a cover layer 36, and a hard coat layer 38 which are stacked in this order.

The first to third spacer layers 30, 32, and 34, the cover layer 36, and the hard coat layer 38 all have a light-transmitting characteristic, and transmit laser light incident from exterior. As a result, the laser light Z incident on the light incident surface 38A of the hard coat 38 can be used to record and read information on/from all the $L_0$ to $L_3$ information recording layers 20, 22, 24, and 26.

The $L_0$ information recording layer 20 is the information recording layer farthest from the light incident surface 38A. The $L_3$ information recording layer 26 is the information recording layer closest to the light incident surface 38A. When recording and reading information on/from the $L_0$ information recording layer 20, the $L_0$ information recording layer 20 is irradiated with the laser light z through the $L_1$ to $L_3$ information recording layers 22, 24, and 26. Similarly, when recording and reading information on/from the $L_1$ information recording layer 22, the $L_1$ information recording layer 22 is irradiated with the laser light Z through the $L_2$ and $L_3$ information recording layers 24 and 26. When recording and reading information on/from the $L_2$ information recording layer 24, the $L_2$ information recording layer 24 is irradiated with the laser light Z through the $L_3$ information recording layer 26. When recording and reading information on/from the $L_3$ information recording layer 26, the $L_3$ information recording layer 26 is irradiated with the laser light Z directly without the intervention of any other information recording layer. In the present embodiment, the $L_0$ information recording layer 20 is made of Si/Cu. The $L_1$ to $L_3$ information recording layers 22, 24, and 26 are made of $TiO_2$/Bi—Ge—O/$TiO_2$.

The $L_0$ to $L_3$ information recording layers 20, 22, 24, and 26 of this multilayer optical recording medium 1 have a recording capacity of 25 GB each, providing a recording capacity of 100 GB in total.

The substrate 10 is a disc-like member having a thickness of approximately 1.1 mm. It may be made of various materials including glass, ceramic, and resin. Polycarbonate resin is used here. Aside from polycarbonate resin, examples of available resins include olefin resin, acrylic resin, epoxy resin, polystyrene resin, polyethylene resin, polypropylene resin, silicone resin, fluorine-based resin, ABS resin, and urethane resin. Of these, polycarbonate resin and olefin resin are preferable in view of workability and moldability. Grooves, lands, pit trains, or the like are also formed in/on the surface of the substrate 10 on the side of the information recording layers, depending on the intended use.

The first to third spacer layers 30, 32, and 34, stacked between the $L_0$ to $L_3$ information recording layers 20, 22, 24, and 26, have the functions of separating the respective information recording layers 20, 22, 24, and 26 from each other. The spacer layers 30, 32, and 34 have grooves (lands), pit trains, or the like on/in their respective surfaces on the side of the light incident surface 38A. The first to third spacer layers 30, 32, and 34 may be made of various materials. As mentioned previously, they must be made of a light-transmitting material, however, so as to transmit the laser light Z. For example, ultraviolet-curing acrylic resin can be used favorably.

This multilayer optical recording medium 1 is also configured so that the first spacer layer 30 has a thickness of 17 μm, the second spacer layer 32 has a thickness of 20 μm, and the third spacer layer 34 has a thickness of 13 μm, or at least no less than 10 μm each. Since the plurality of spacer layers 30, 32, and 34 have respective different thicknesses like these, interference between read signals can be reduced to reduce noise in the read signals. These differences in thickness are preferably at least 2 μm or more. The hard coat layer 38 has a thickness of 2 μm. The cover layer 36 has a thickness of 48 μm. With this multilayered configuration of the information recording layers 20, 22, 24, and 26, the information recording layers 22, 24, and 26 must have high light-transmission capabilities so that the laser light Z reaches the $L_0$ information recording layer 20, the farthest from the light incident surface 38A, with sufficient intensity.

This optical recording medium 1 is then configured as follows: The distance from the light incident surface 38A to the $L_3$ information recording layer 26 is approximately 50 μm. The distance from the light incident surface 38A to the $L_2$ information recording layer 24 is approximately 63 μm. The distance from the light incident surface 38A to the $L_1$ information recording layer 22 is approximately 83 μm. The distance from the light incident surface 38A to the $L_0$ information recording layer 20 is approximately 100 μm. It follows that the $L_0$ information recording layer 20 meets the Blu-ray Disc standard, including the recording capacity (25 GB).

These $L_0$ to $L_3$ information recording layers 20, 22, 24, and 26 are the layers responsible for data retention. The mode of data retention is of so-called recordable type, capable of user's writing. More specifically, this recordable type includes a write-once mode in which data-written areas cannot be written again, and a rewritable mode in which data-written areas can be erased and rewritten with data. Either one of the modes may be used here. The information recording layers 20, 22, 24, and 26 may be in different modes of data retention.

Although not shown in particular, the $L_0$ to $L_3$ information recording layers 20, 22, 24, and 26 have spiral grooves and lands. The grooves function as a guide track for the laser light Z when recording data. The laser light Z, traveling along these grooves, is modulated in energy intensity so that recording marks are formed on the grooves of the recording layers 20, 22, 24, and 26. If the data retention mode is write-once, these recording marks are formed in an irreversible fashion, and thus cannot be erasable. If the data retention mode is rewritable, on the other hand, the recording marks are formed in a reversible fashion, and can thus be erased and formed again. The recording marks may be formed on the lands, or both on the grooves and the lands.

Although not shown in particular, this multilayer optical recording medium 1 also has a disc information area near its innermost or outermost periphery. This disc information area contains in advance the ground information for setting the recording power for the multilayer optical recording medium 1. Note that this ground information is determined by the method for setting recording power shown in FIG. 2.

Figure 4:
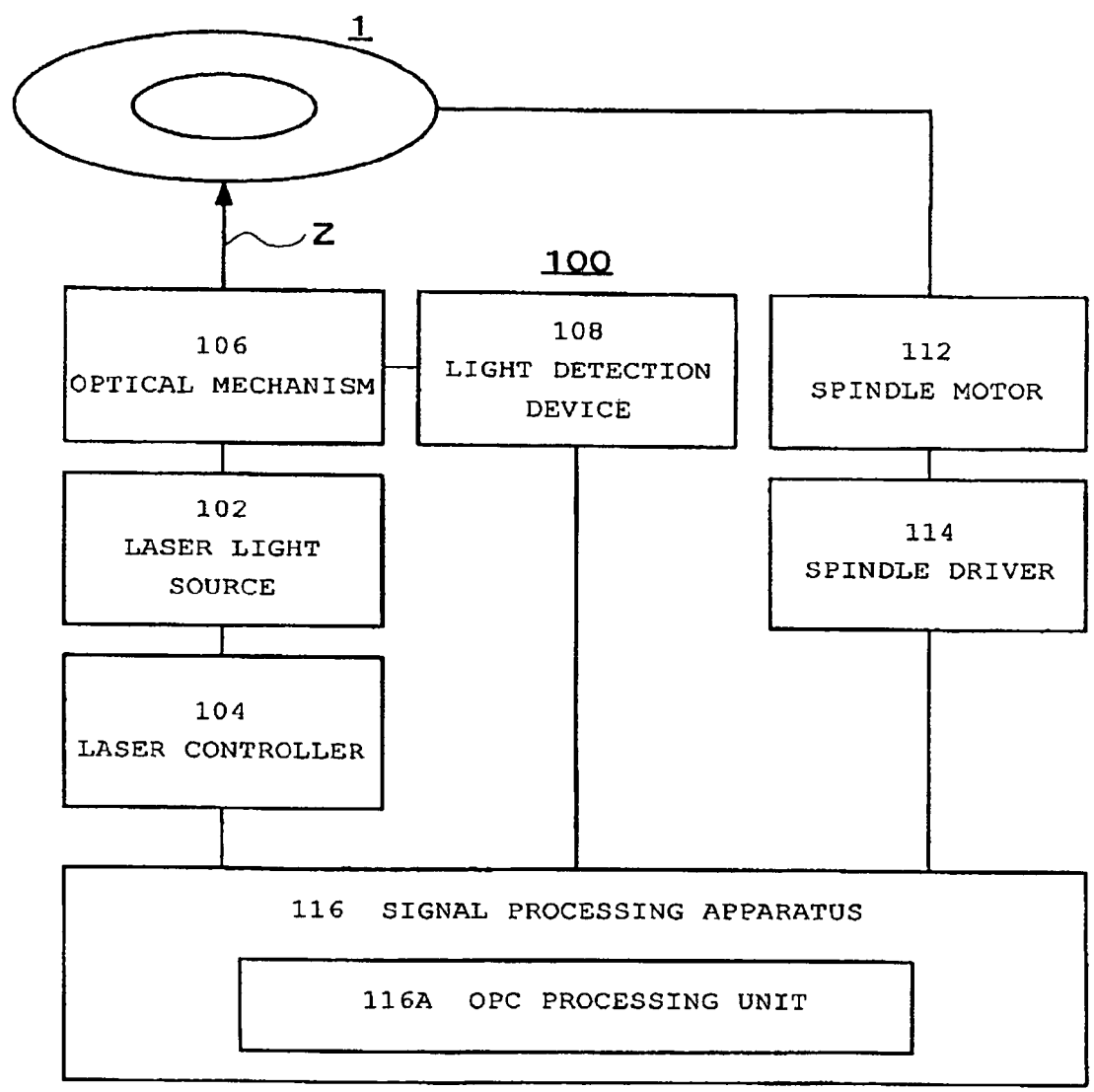
FIG. 4 is a block diagram showing the configuration of an information recording apparatus according to the embodiment of the present invention.

Next, an information recording apparatus 100 for implementing the information recording method according to the present embodiment will be described with reference to FIG. 4. This information recording apparatus 100 includes the following components: a laser light source 102 for generating the laser light Z to be used for recording and reading; a laser controller 104 for controlling the laser light source 102; an optical mechanism 106 for guiding the laser light Z to the multilayer optical recording medium 1; a light detection device 108 for detecting reflection of the laser light Z; a spindle motor 112 for rotating the multilayer optical recording medium 1; a spindle driver 114 for performing a rotation control on the spindle motor 112; and a signal processing apparatus 116 for exchanging signal data with a CPU (Central Processing Unit) which is not shown in particular, and performing a recording and read control based on recording signal data and read signal data. The signal processing apparatus 116 includes an OPC processing unit 116A which reads information from the disc information area of the multilayer optical recording medium 1 and optimizes the recording power.

The laser light source 102 is a semiconductor laser, and generates the laser light Z under the control of the laser controller 104. The optical mechanism 106 includes a half mirror and an objective which are not shown in particular, and is capable of focusing the laser light Z on the $L_0$ to $L_3$ information recording layers 20, 22, 24, and 26 when necessary. The half mirror extracts reflected light from the $L_0$ to $L_3$ information recording layers 20, 22, 24, and 26, and guides it to the light detection device 108. The light detection device 108 is a photodetector, and receives the laser light Z to output a signal. This signal is supplied to the signal processing apparatus 116 and used as control data or read signal data, some of which is output to the not-shown CPU.

The OPC processing unit 116A of the signal processing apparatus 116 performs so-called OPC (Optimum Power Control) processing in cooperation with the laser controller 104. Specifically, it reads various types of basic information including the ground information for setting recording power, recorded in the disc information area of the multilayer optical recording medium 1. Based on this basic information, the OPC processing unit 116A performs power-test recording and reading on the multilayer optical recording medium 1, thereby setting the optimum recording power.

When recording signal data supplied from the CPU onto the multilayer optical recording medium 1, the laser controller 104 controls the laser light source 102 to generate laser light Z that is set to the foregoing optimum recording power, based on an instruction from the signal processing apparatus 116 which receives the signal data. This laser light z is guided by the optical mechanism 106 to irradiate any one of the $L_0$ to $L_3$ information recording layers 20, 22, 24, and 26 with its laser spot. The energy of this laser spot forms recording marks on the one of the $L_0$ to $L_3$ information recording layers 20, 22, 24, and 26.

When reading information recorded on the multilayer optical recording medium 1, on the other hand, the laser light source 102 generates reading laser light, and irradiates the $L_0$ to $L_3$ information recording layers 20, 22, 24, and 26 with this reading laser light. The reading laser light is reflected by the $L_0$ to $L_3$ information recording layers 20, 22, 24, and 26, is taken out through the optical mechanism 106, and is guided to the light detection device 108. The resulting read signal is then supplied to the CPU through the signal processing apparatus 116.

As above, according to the method for setting recording power of the present embodiment, the $L_0$ information recording layer 20 is evaluated for recording power margins for the respective cases when all the $L_1$ to $L_3$ information recording layers 22, 24, and 26 lying closer to the light incident surface than this $L_0$ information recording layer 20 does are in the low transmittance state (i.e., recorded state), and when all the $L_1$ to $L_3$ information recording layers 22, 24, and 26 are in the high transmittance state (i.e., blank state). The ground information for setting recording power is then determined so as to apply to both the margins. Examples of this ground information determined include a recording power range that applies to both the foregoing recording power margins, a certain recommended recording power value within the same, and an optimum power value. Consequently, if the recording power is set within or in the vicinity of this ground information, it is possible to form recording marks on the intended information recording layer to be recorded without the influence of the presence or absence of recording marks on the other information recording layers.

In particular, according to the present embodiment, the ground information for setting the recording power is determined with the $L_0$ information recording layer 20, the farthest from the light incident surface, as the target of evaluation. This $L_0$ information recording layer 20 produces recording errors easily since it has a greatest disparity between the recording power margin when all the other $L_1$ to $L_3$ information recording layer 22, 24, and 26 are in the high transmittance state (blank state) and the recording power margin when in the low transmittance state (recorded state). The method for setting recording power according to the present embodiment can thus provide an appropriate setting of recording power when applied to the $L_0$ information recording layer 20. Note that the ground information determined from this $L_0$ information recording layer 20 is also suitably used as the ground information for setting recording power for the remaining $L_1$ to $L_3$ information recording layers 22, 24, and 26.

In the present embodiment, the multilayer optical recording medium 1 has three or more layers, or concretely four layers, of information recording layers. The foregoing disparity between the recording power margins in the low transmittance state (recorded state) and in the high transmittance state (blank state) therefore tends to become greater. The method for setting recording power according to the present embodiment can facilitate determining the ground information for setting recording power with reliability when applied to this type of multilayer optical recording medium 1.

Besides, according to the present embodiment, the ground information is recorded in the disc information area of this multilayer optical recording medium 1 in advance. The information recording apparatus 100 reads this ground information to perform the OPC processing. This makes it possible to set the recording power capable of forming recording marks with stability, irrespective of whether each information recording layer of the multilayer optical recording medium 1 is in the recorded state or blank state. As a result, it is possible to reduce recording errors.

EXAMPLE 1

The multilayer optical recording medium 1 described in the foregoing embodiment was manufactured. Recording marks were initially formed on all the $L_1$ to $L_3$ information recording layers 22, 24, and 26 at random for the sake of the "recorded state." Information was then recorded on the $L_0$ information recording layer 20, and a recording power margin was measured. All the $L_1$ to $L_3$ information recording layers 22, 24, and 26 were then brought into the "blank state." Information was then recorded on the $L_0$ information recording layer 20, and a recording power margin was measured. Table 5 shows the measurements. In this example, the recording power margins were determined by using a jitter a of up to 11% as the evaluation criterion for an allowable recording power margin.

Figure 5:
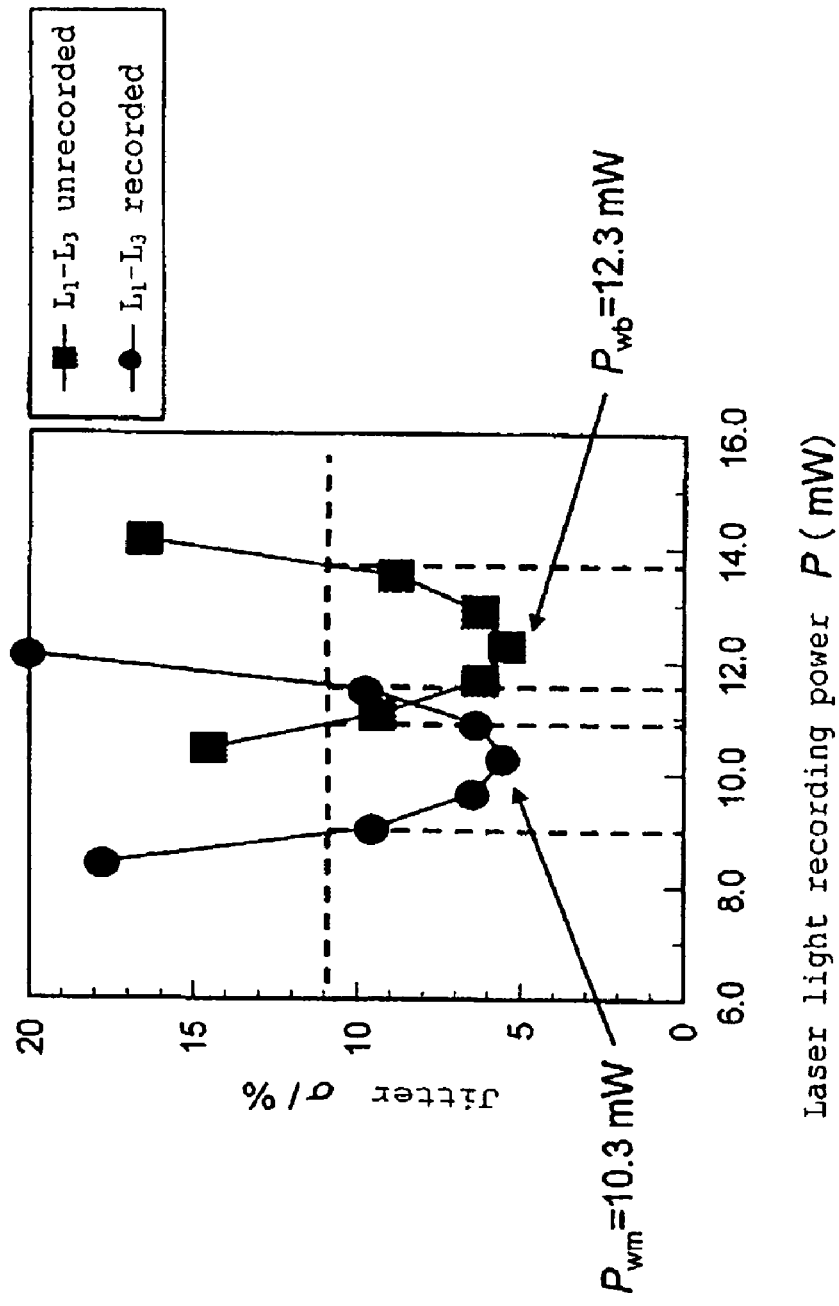
FIG. 5 is a graph showing recording power margins according to the embodiment of the present invention.

As is clear from FIG. 5, the $L_0$ information recording layer 20 showed a recording power margin of 9.0 to 11.5 mW when all the $L_1$ to $L_3$ information recording layers 22, 24, and 26 were in the recorded state. When all the $L_1$ to $L_3$ information recording layers 22, 24, and 26 were in the blank state, the $L_0$ information recording layer 20 showed a recording power margin of 10.8 to 13.6 mW. The ground information for setting recording power is thus determined to be the range of 10.8 to 11.5 mW which applies to both the recording power margins.

Considering only the case where all the $L_1$ to $L_3$ information recording layers 22, 24, and 26 are in the recorded state, favorable recording power is Pwm=10.3 mW which minimizes the jitter. Considering only the case where all are in the blank state, on the other hand, favorable recording power is Pwb=12.3 mW which minimizes the jitter. These recording power values Pwm and Pwb, however, fall outside the range of the ground information for setting recording power mentioned above. Suppose that the optimum recording power of this multilayer optical recording medium 1 is set at the recording power of Pwm=10.3 mW. Then, the recording quality of the $L_0$ information recording layer 20 will drop below an acceptable level when all the $L_1$ to $L_3$ information recording layers 22, 24, and 26 are in the blank state. Suppose also that the optimum recording power of this multilayer optical recording medium 1 is set at the recording power of Pwb=12.3 mW. The recording quality of the $L_0$ information recording layer 20 will drop below an acceptable level when all the $L_1$ to $L_3$ information recording layers 22, 24, and 26 are in the recorded state.

Based on the foregoing discussion, the ground information for setting recording power, applicable to both the requirements in the recorded state and the blank state, can be used as the reference set value of the recording power in this practical example. This makes it always possible to set optimum recording power capable of meeting any change in the recording states of the $L_0$ to $L_3$ information recording layers 20, 22, 24, and 26.

The information recording apparatus according to the present embodiment has dealt with the case where the multilayer optical recording medium has four layers within an extremely narrow range of approximately 100 μm from the light incident surface. The present invention is not limited thereto, however, and the information recording layers may be arranged beyond 100 μm. The present embodiment has also dealt only with the case where the multilayer optical recording medium has four information recording layers. The present invention is not limited thereto, however, and the multilayer optical recording layer medium has only to have a plurality of layers, or preferably three or more layers. The present embodiment has also dealt with the case where the information recording layer farthest from the light incident surface 38A is referred to as $L_0$ information recording layer, the second farthest information recording layer as $L_1$ information recording layer, the third farthest information recording layer as $L_2$ information recording layer, and the fourth farthest information recording layer as $L_3$ information recording layer. This terminology is merely for convenience's sake, not of limitation of the present invention.

The multilayer optical recording medium according to the present embodiment has dealt with the case where the ground information for setting recording power is determined before mass production, and this ground information is recorded in the disc information area in advance. The present invention is not limited thereto, however. Specifically, low transmittance test areas and high transmittance test areas may be formed on the radially inner or outer sides of the respective information recording layers. The low transmittance test areas produce a low transmittance state equivalent to that of the information recording layers. The high transmittance test areas produce a high transmittance state equivalent to that of the information recording layers. The OPC processing unit of the information recording apparatus then performs the setting method shown in FIG. 2 on each individual piece of multilayer optical recording media to set the ground information for setting recording power or the optimum recording power when necessary. Before starting actual recording, the information recording apparatus records test data on a test recording area of the $L_0$ information recording layer through the low transmittance test areas of the $L_1$ to $L_3$ information recording layers, and records test data on another test recording area of the $L_0$ information recording layer through the high transmittance test areas of the $L_1$ to $L_3$ information recording layers. The ground information for setting recording power is determined from the quality of read signals of these test data, and the optimum recording power is set based on this ground information. This modification makes it possible to set the recording power in consideration of such factors as secular degradation of the multilayer optical recording medium and the ambient temperature. It is also preferable that this latest ground information for setting recording power be added and recorded in the disc information area.

Figure 6:
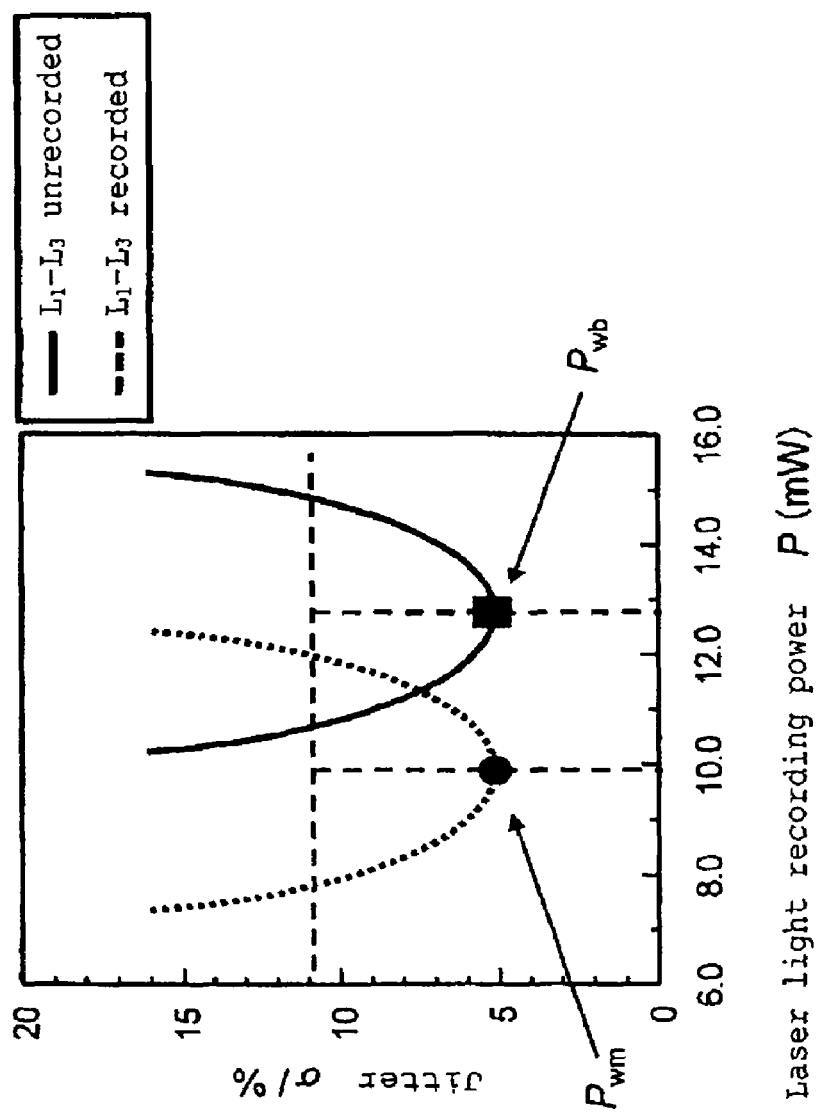
FIG. 6 is a graph for showing another evaluation method for determining ground information according to the embodiment of the present invention.

The present embodiment has also dealt only with the case where the $L_0$ information recording layer 20 is evaluated for recording power margins for the respective cases when all the $L_1$ to $L_3$ information recording layers 22, 24, and 26 are in the recorded state and when all the $L_1$ to $L_3$ information recording layers 22, 24, and 26 are in the blank state. The power range that applies to both the power margins is then set as the ground information. The present invention is not limited thereto, however. For example, as shown in FIG. 6, the recording power range between the recording power Pwm, which minimizes the jitter in the foregoing recorded state, and the recording power Pwb, which minimizes the jitter in the foregoing blank state, may be determined to be the ground information (Pwm to Pwb). As described previously, the vicinities of these recording power values Pwm and Pwb that define the numerical range surely provide sufficient recording quality in either one of the recorded state and the blank state, but not in the other. Nevertheless, this ground information can be utilized, for example, to set the intermediate value between the two recording power values Pwm and Pwb (=½×(Pwm+Pwb)) as optimum recording power which satisfies both the states. This kind of ground information can thus be used satisfactorily as the reference values for setting the recording power.

Figure 7:
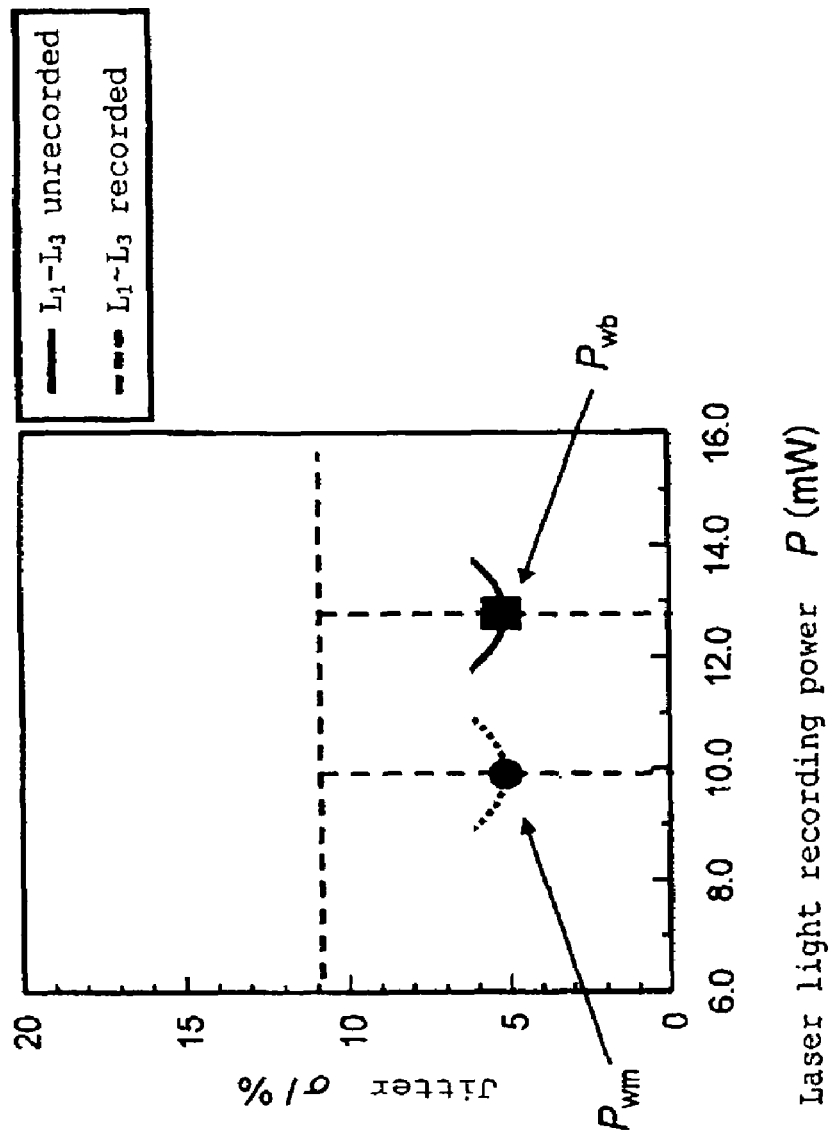
FIG. 7 is a graph for showing another evaluation method for determining ground information according to the embodiment of the present invention.

From the foregoing, it is seen that the ground information can be determined without comprehensive evaluation of both the recording power margins that satisfy the reference jitter in the recorded state and the blank state, respectively. As shown in FIG. 7, the recording power range from the recording power Pwm, which minimizes the jitter in the foregoing recorded state, to the recording power Pwb, which minimizes the jitter in the foregoing blank state, may be calculated directly and determined to be the ground information (Pwm to Pwb). In other words, the present invention is not limited to the case where the evaluation steps in the recorded state and the blank state include comprehensive evaluation of all the recording power margins that satisfy the reference quality.

Figure 8:
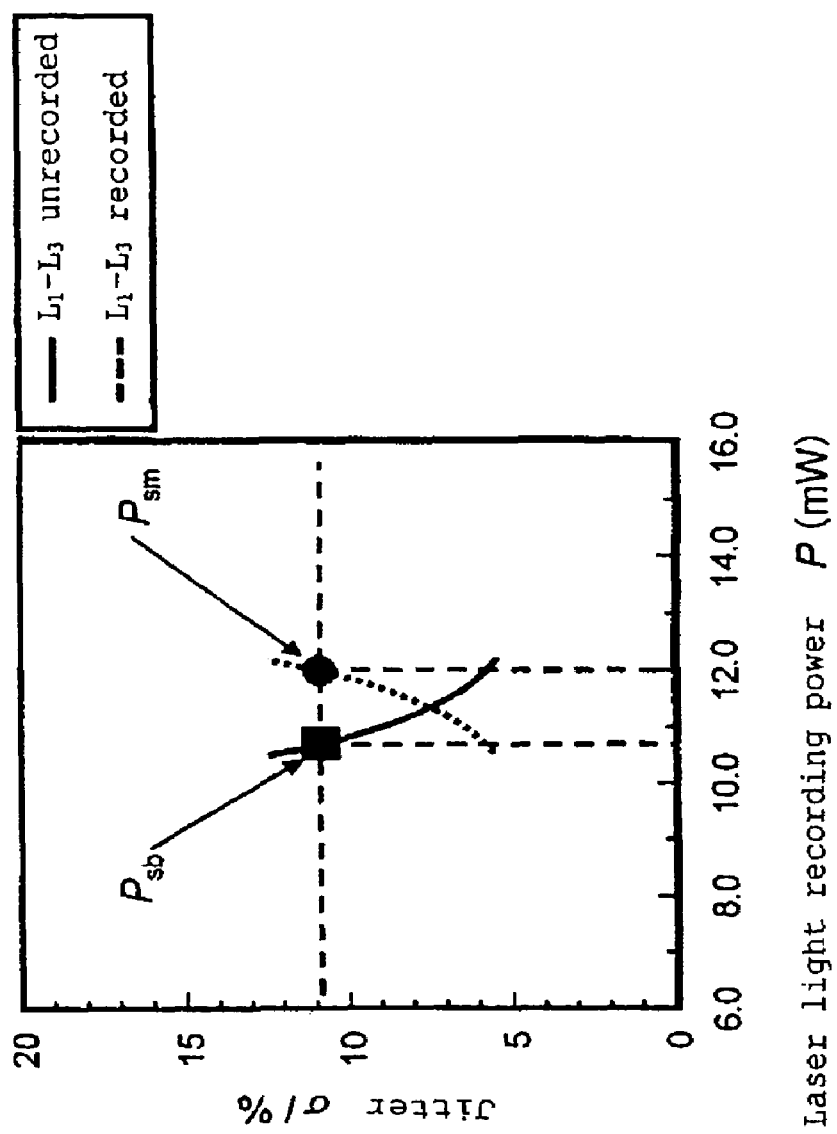
FIG. 8 is a graph for showing another evaluation method for determining ground information according to the embodiment of the present invention.

Moreover, as shown in FIG. 8, maximum recording power Psm that satisfies the reference jitter may be evaluated directly in the evaluation step in the recorded state. Minimum recording power Psb that satisfies the reference jitter may be evaluated directly in the evaluation step in the blank state. These evaluations can be used to determine the recording power range of Psb to Psm as the ground information.

Now, the present embodiment has also dealt with the case where the multilayer optical recording medium 1 previously has recording layers for the recording marks to be formed on through the irradiation of the laser light. The present invention is not limited thereto, however. For example, an optical recording medium of so-called volumetric recording type may also be used, whose base material itself is made of a single monolitic layer. When irradiated with laser light, this base material produces a change of state only in the focus position of the beam spot, thereby forming a recording mark. That is, the multilayer optical recording medium according to the present invention is not limited to ones in which a plurality of recording layers to be irradiated with laser light are formed in advance, but may include ones in which recording marks are formed in planar areas when necessary, and sets of these recording marks constitute a plurality of information recording layers retrospectively.

The present embodiment has also dealt with the case where only the $L_0$ information recording layer farthest from the light incident surface 38A is subjected to the evaluation for setting the recording power. The present invention is not limited thereto, however. For example, the $L_1$ information recording layer or the $L_2$ information recording layer may be subjected to the evaluation. Ground information for setting recording power may also be determined for each information recording layer separately, so that the recording power is set independently by using the same technique.

As has been described in the present embodiment, the present invention is not limited to the case where the information recording layers drop in light transmittance when recording marks are formed thereon, and may be applied to such recording mode that the light transmittance increases with the formation of recording marks. It is only essential that the light transmittance varies depending on the presence or absence of recording marks, and recording power margins are evaluated in both the resulting low and high transmittance states.

It is understood that the information recording apparatus of the present invention is not limited to the foregoing embodiment, and various modifications may be made without departing from the gist of the invention.

According to the present invention, it is possible to set recording power capable of providing stable recording quality all the time even for a multilayer optical recording medium that is capable of forming a plurality of information recording layers.

The entire disclosure of Japanese Patent Application No. 2007-184076 filed on 13 Jul. 2007 including specification, claims, drawings, and summary are incorporated herein by reference in its entirety.

What is claimed is:

1. A method for setting recording power of recording light for an information recording layer of a multilayer optical recording medium to be irradiated with, the method comprising:
   a low transmittance state evaluation step of evaluating recording power capable of recording information on an information recording layer to be evaluated when all the information recording layer(s) lying closer to a light incident surface than the information recording layer to be evaluated does is/are in a low transmittance state based on the presence or absence of a recording mark;
   a high transmittance state evaluation step of evaluating recording power capable of recording information on the information recording layer to be evaluated when all the information recording layer(s) lying closer to the light incident surface than the information recording layer to be evaluated does is/are in a high transmittance state based on the presence or absence of a recording mark; and
   a ground information determination step of determining ground information for setting recording power for use on the information recording layer to be evaluated, based on the recording power evaluated at the low transmittance state evaluation step and the recording power evaluated at the high transmittance state evaluation step.

2. The method for setting recording power of recording light according to claim 1, wherein the ground information determined is any one of a numerical range of the recording power, a recommended value of the recording power, and an optimum value of the recording power.

3. The method for setting recording power of recording light according to claim 2, wherein:
   the low transmittance state evaluation step includes evaluating a recording power margin of the recording light for the information recording layer to be evaluated to be irradiated with;
   the high transmittance state evaluation step includes evaluating a recording power margin of the recording light for the information recording layer to be evaluated to be irradiated with; and
   the ground information determination step includes determining the ground information within a range that applies to both the recording power margin evaluated at the low transmittance state evaluation step and the recording power margin evaluated at the high transmittance state evaluation step.

4. The method for setting recording power of recording light according to claim 2, wherein the multilayer optical recording medium is capable of forming three or more information recording layers.

5. The method for setting recording power of recording light according to claim 2, wherein the ground information is determined with the information recording layer farthest from the light incident surface as the one to be evaluated.

6. A multilayer optical recording medium having a management area in which the ground information according to claim 2 is recorded in advance.

7. The method for setting recording power of recording light according to claim 1, wherein:
   the low transmittance state evaluation step includes evaluating a recording power margin of the recording light for the information recording layer to be evaluated to be irradiated with;
   the high transmittance state evaluation step includes evaluating a recording power margin of the recording light for the information recording layer to be evaluated to be irradiated with; and
   the ground information determination step includes determining the ground information within a range that applies to both the recording power margin evaluated at the low transmittance state evaluation step and the recording power margin evaluated at the high transmittance state evaluation step.

8. The method for setting recording power of recording light according to claim 7, wherein the multilayer optical recording medium is capable of forming three or more information recording layers.

9. The method for setting recording power of recording light according to claim 7, wherein the ground information is determined with the information recording layer farthest from the light incident surface as the one to be evaluated.

10. A multilayer optical recording medium having a management area in which the ground information according to claim 7 is recorded in advance.

11. The method for setting recording power of recording light according to claim 1, wherein the multilayer optical recording medium is capable of forming three or more information recording layers.

12. The method for setting recording power of recording light according to claim 11, wherein the ground information is determined with the information recording layer farthest from the light incident surface as the one to be evaluated.

13. A multilayer optical recording medium having a management area in which the ground information according to claim 11 is recorded in advance.

14. The method for setting recording power of recording light according to claim 1, wherein the ground information is determined with the information recording layer farthest from the light incident surface as the one to be evaluated.

15. A multilayer optical recording medium having a management area in which the ground information according to claim 14 is recorded in advance.

16. A multilayer optical recording medium having a management area in which the ground information according to claim 1 is recorded in advance.

17. A multilayer optical recording medium comprising:
   a low transmittance test area for producing a low transmittance state equivalent to one the information recording layers take based on the presence or absence of a recording mark; and
   a high transmittance test area for producing a high transmittance state equivalent to one the information recording layers take based on the presence or absence of a recording mark.

18. A method for recording information on a multilayer optical recording medium by irradiating an information recording layer of the optical recording medium with recording light to record information on the information recording layer, the multilayer optical recording medium being capable of forming three or more information recording layers, wherein
   information is recorded by irradiating the information recording layer to be recorded with recording light having optimum recording power that applies to both recording power capable of recording information on the information recording layer to be recorded when all the information recording layer(s) lying closer to a light incident surface than the information recording layer to be recorded does is/are in a low transmittance state based on the presence or absence of a recording mark, and recording power capable of recording information on the information recording layer to be recorded when all the information recording layer(s) lying closer to the light incident surface than the information recording layer to be recorded does is/are in a high transmittance state based on the presence or absence of a recording mark.

* * * * *